(No Model.)

C. N. MERIWETHER.
NUT LOCK.

No. 529,742. Patented Nov. 27, 1894.

Witnesses.
A. N. Norris
Robert Everett

Inventor.
Charles N. Meriwether
By James L. Norris
Atty.

THE NORRIS PETERS CO., PHOTO-LITHO., WASHINGTON, D. C.

UNITED STATES PATENT OFFICE.

CHARLES N. MERIWETHER, OF CLARKSVILLE, TENNESSEE.

NUT-LOCK.

SPECIFICATION forming part of Letters Patent No. 529,742, dated November 27, 1894.

Application filed March 31, 1894. Serial No. 505,897. (No model.)

*To all whom it may concern:*

Be it known that I, CHARLES N. MERIWETHER, a citizen of the United States, residing at Clarksville, in the county of Montgomery and State of Tennessee, have invented new and useful Improvements in Nut Locks, of which the following is a specification.

This invention has for its object to provide novel, simple and efficient means for securing nuts on bolts without the employment of extraneous nut-locking devices which are separate from the nut, whereby the expense involved in applying the nut locks and the cost of manufacture are materially reduced, and a superior nut-lock is provided which possesses many advantages, in that there are no extraneous parts liable to be displaced or lost, and the simple screwing on of the nut effects the locking thereof on the bolt, so that the nut cannot unscrew or turn independent of the bolt.

To accomplish this object my invention consists in the features of construction and the combination or arrangement of parts hereinafter described and claimed, reference being made to the accompanying drawings, in which—

Figure 1:
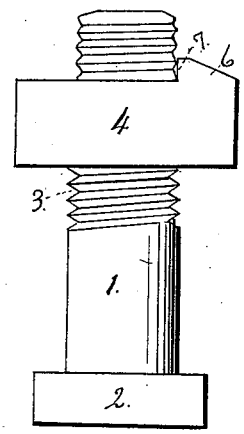
Figure 3:
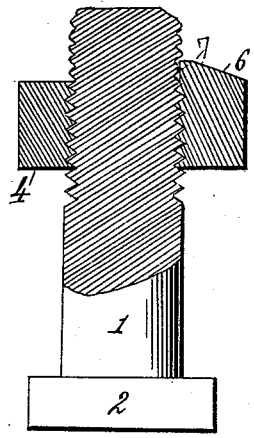
Figure 2:
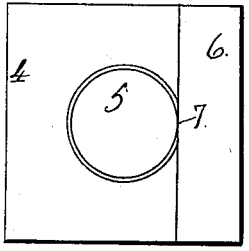
Figure 4:
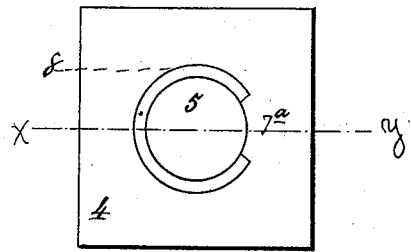
Figure 6:
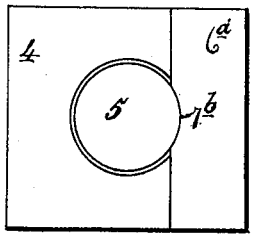
Figure 5:
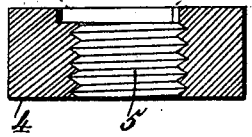

Figure 1 is a side elevation of a bolt and nut embodying my invention. Fig. 2 is a top plan view of the same. Fig. 3 is a longitudinal sectional view. Fig. 4 is a top plan view of a nut, showing a modification of my invention. Fig. 5 is a section taken on the line $x$—$y$—, Fig. 4, and Fig. 6 is a plan view of another modification.

In order to enable those skilled in the art to make and use my invention, I will now describe the same in detail, referring to the drawings, wherein—

The numeral 1 indicates the body of a bolt having a head 2 and a screw-threaded portion 3, as usual. The body of the bolt is circular in cross-section and the nut 4, as herein illustrated, is square or rectangular, but obviously it may have any outline desired. The nut is provided as usual with a screw-threaded orifice 5, and it is formed integral at one side of the orifice with an elevated rib-like portion 6 extending across the outer face of the nut, and lying tangential to the screw-threaded orifice therein. There is a vacant space at the side of the orifice 5 opposite the rib-like portion 6, and the latter, as herein shown, extends continuously from one edge to the opposite edge of the nut, and the rectilinear inner face 7—Fig. 2—of this rib-like portion is unthreaded, so that when the nut is screwed on the bolt the unthreaded face 7 of the rib-like portion 6 presses against and mutilates a portion of the thread of the bolt, as indicated in Fig. 3, whereby it is impossible for the nut to subsequently unscrew or become loose.

In the modified construction—Fig. 4—the outer face of the nut is circularly recessed or cut away, as at 8, in such manner as to leave a rib-like portion $7^a$, the face of which is unthreaded, and which acts to press against and mutilate a part of the thread of the bolt when the nut is screwed thereon. The recessed or cut-away portion, Figs. 4, and 5, provides a vacant space at the side of the orifice 5 opposite the rib-like portion $7^a$.

In the modification, Fig. 6, the construction is the same as described with reference to Figs. 1 and 2, except that the face $7^b$ of the rib-portion $6^a$ is curved as shown, similar to the face of the rib-portion $7^a$, Fig. 4.

I have heretofore constructed a nut with an annular unthreaded surface at one end of the screw-threaded orifice for the purpose of producing a nut-lock of the character described; but I found the construction impracticable, owing to the difficulty of screwing the nut on to a bolt. No nut is perfectly tight on a bolt; but, on the contrary, there is more or less space between the threads of the nut and the bolt, and it is only when the nut reaches the usual washer and begins to pull and draw the bolt that the threads become tight. With the annular unthreaded surface the nut cannot tilt or be pressed askew, and as this surface has heretofore been constructed and arranged, in putting on the nut, the latter is either split or the unthreaded annular surface will be pushed off. There is also danger of the threads on the bolt below the nut being turned off. The result is similar to the result in endeavoring to run a nut down upon the unthreaded part of a bolt—the nut will split, or the threads will be turned off the bolt. In my present invention the unthreaded portion lies outside the threaded portion of the nut, and there is a vacant space at the side of the orifice opposite the unthreaded portion. By this means the nut can tilt obliquely to the bolt, or be pressed askew, so that the threads of the bolt are not unduly abraded, but when it comes against the washer and begins to pull or draw the bolt, the pulling or drawing strain tends to force the nut square on the bolt, and causes the unthreaded surface 7, or $7^a$, or $7^b$, to press tightly against the bolt. The susceptibility of the nut tilting or yielding to one side makes this type of nut-locks perfectly practicable, and the nut is locked partly by friction, and partly by the abrasion of the thread of the bolt. The cut-away, or entirely vacant space opposite the unthreaded rib-like portion enables the bolt or nut to give, so that the threads can pass without being unduly abraded or flattened, but when the nut begins to be pressed on its lower surface, it is thrown square on the bolt, and the pressing of the rib-like portion on the thread of the bolt is increased, which causes friction, and also causes the rib-like portion to more or less engage the thread of the bolt.

My invention provides a new and improved nut-lock which possesses simplicity of construction and can be very economically applied, while all separate or extraneous nut-locking devices are dispensed with, and the nut is locked by the simple act of screwing it on the bolt. In these respects my invention possesses advantages over those nut-locks wherein separate devices must be applied for the purpose of locking the nut in engagement with the bolt.

Having thus described my invention, what I claim is—

1. The combination with a screw-bolt, of a screw-nut having at one end of the threaded orifice an unthreaded portion at one side and a vacant space at the side opposite the unthreaded portion for the purpose of permitting the nut to tilt while screwing it on the bolt, said unthreaded portion pressing against and abrading a portion of the thread of the bolt when the nut is tightened, substantially as described.

2. The combination with a screw-bolt, of a screw-nut having an elevated rib-portion lying tangential to one side of the threaded orifice in the nut, and a vacant space at the opposite side to permit the nut to tilt while screwing it on the bolt, said rib-portion pressing against and abrading a portion of the thread of the bolt when the nut is tightened, substantially as described.

In testimony whereof I have hereunto set my hand and affixed my seal in presence of two subscribing witnesses.

CHARLES N. MERIWETHER. [L. S.]

Witnesses:
C. B. LYLE,
R. H. BURNEY.